(12) United States Patent
Farrell et al.

(10) Patent No.: US 9,571,785 B2
(45) Date of Patent: Feb. 14, 2017

(54) SYSTEM AND METHOD FOR FINE-GRAINED CONTROL OF PRIVACY FROM IMAGE AND VIDEO RECORDING DEVICES

(71) Applicant: INTERNATIONAL BUSINESS MACHINES CORPORATION, Armonk, NY (US)

(72) Inventors: Robert G Farrell, Cornwall, NY (US); James R Kozloski, New Fairfield, CT (US); Clifford A Pickover, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 222 days.

(21) Appl. No.: 14/250,935

(22) Filed: Apr. 11, 2014

(65) Prior Publication Data
US 2015/0296170 A1    Oct. 15, 2015

(51) Int. Cl.
*H04N 9/80* (2006.01)
*H04N 5/913* (2006.01)
*H04N 9/82* (2006.01)

(52) U.S. Cl.
CPC ............ *H04N 5/913* (2013.01); *H04N 9/8227* (2013.01); *H04N 2005/91321* (2013.01); *H04N 2005/91335* (2013.01); *H04N 2005/91357* (2013.01)

(58) Field of Classification Search
CPC ...................... H04N 5/913; H04N 2005/91357; H04N 5/232; H04N 2005/91335; H04N 2005/91321; H04N 2005/913; H04N 9/882; G08B 13/19686; G08B 13/19667

(Continued)

(56) References Cited

U.S. PATENT DOCUMENTS 5,581,629 A * 12/1996 Hanna ................. H04N 5/2723
                                                  348/E5.058
6,509,926 B1 * 1/2003 Mills .................. G08B 13/1968
                                                  348/143

(Continued)

FOREIGN PATENT DOCUMENTS

FR              2934748 A1      2/2010
WO         WO 97/03517      *  1/1997
WO     WO 2014/038924 A2 *   3/2014

OTHER PUBLICATIONS

K.N. Truong et al., "Preventing camera recording by designing a capture-resistant environment," Ubiquitous Computing, UbiComp 2005 (Springer Berlin Heidelberg, 2005) pp. 73-86.

(Continued)

*Primary Examiner* — David Harvey
(74) *Attorney, Agent, or Firm* — Tutunjian & Bitetto, P.C.; Vazken Alexanian

(57) ABSTRACT

A system and method for fine-grained privacy control of image and video recordings uses a model-based approach to solve privacy issues. The method includes steps of: receiving a digital capture of a subject bound by privacy constraints; receiving information regarding the subject, the environment, and the privacy constraints; using the information to generate a model image of the subject within the environment; associating a disposition tag with an appearance of the subject in the model image; and comparing the model image with the digital capture to determine coordinates in the recording where a privacy control action, such as a blocking action, should be applied.

20 Claims, 7 Drawing Sheets

(58) Field of Classification Search
USPC .......................................................... 386/254
See application file for complete search history.

(56) References Cited

U.S. PATENT DOCUMENTS

| | | | |
|---|---|---|---|
| 7,207,480 B1 | 4/2007 | Geddes | |
| 7,230,653 B1* | 6/2007 | Overton | G06T 19/00 348/584 |
| 7,366,359 B1* | 4/2008 | Davey | G06K 9/00771 346/143 |
| 7,423,667 B2* | 9/2008 | Hayasaka | G08B 13/19682 348/143 |
| 7,450,163 B2 | 11/2008 | Rothschild | |
| 7,562,397 B1* | 7/2009 | Mithal | G06Q 30/0235 705/52 |
| 7,570,283 B2* | 8/2009 | Sato | H04N 1/00281 348/211.2 |
| 7,907,180 B2* | 3/2011 | Takayama | H04N 5/232 348/159 |
| 8,126,190 B2 | 2/2012 | Jung | |
| 8,203,609 B2* | 6/2012 | Jung | H04N 1/0084 348/143 |
| 8,744,143 B2* | 6/2014 | Chen | G06F 21/6245 348/143 |
| 8,872,817 B2* | 10/2014 | Kim | G06T 17/00 345/419 |
| 9,058,523 B2* | 6/2015 | Merkel | G06K 9/00771 |
| 2003/0163724 A1* | 8/2003 | Tayebi | G06Q 30/06 726/26 |
| 2004/0202382 A1* | 10/2004 | Pilu | H04N 1/00167 382/276 |
| 2005/0010530 A1 | 1/2005 | Kakutani et al. | |
| 2005/0270372 A1 | 12/2005 | Henninger | |
| 2006/0192853 A1* | 8/2006 | Lee | G06T 3/00 348/143 |
| 2006/0257041 A1* | 11/2006 | Kameyama | G06T 11/60 382/254 |
| 2007/0115356 A1* | 5/2007 | Kang | G06T 7/0026 348/143 |
| 2007/0150340 A1* | 6/2007 | Cartmell | G06Q 10/10 705/14.55 |
| 2007/0296817 A1* | 12/2007 | Ebrahimi | G08B 13/19667 348/161 |
| 2008/0117295 A1* | 5/2008 | Ebrahimi | G08B 13/19604 348/143 |
| 2009/0217344 A1* | 8/2009 | Bellwood | G06F 21/10 726/1 |
| 2009/0262987 A1* | 10/2009 | Ioffe | G06K 9/00281 382/118 |
| 2010/0080410 A1 | 4/2010 | Deluca | |
| 2010/0323608 A1* | 12/2010 | Sanhedrai | H04N 5/225 455/1 |
| 2011/0158470 A1* | 6/2011 | Martin | H04N 19/647 382/100 |
| 2011/0202968 A1* | 8/2011 | Nurmi | G06F 21/10 726/1 |
| 2011/0211040 A1* | 9/2011 | Lindemann | G01C 11/02 348/36 |
| 2013/0136316 A1* | 5/2013 | Grassel | G06K 9/00677 382/115 |
| 2015/0062287 A1* | 3/2015 | Reinhardt | H04N 21/23418 348/36 |
| 2015/0145992 A1* | 5/2015 | Traff | G06T 11/60 348/143 |
| 2015/0242638 A1* | 8/2015 | Bitran | G06F 21/60 726/26 |
| 2015/0296170 A1* | 10/2015 | Farrell | H04N 5/913 386/254 |

OTHER PUBLICATIONS

I Echizen, "Privacy Protection Techniques Using Differences in Human and Device Sensitivity," National Institutue of Informatics (Japan), Press Release, Dec. 12, 2012, 5 pages.

J. Wortham, "Stealth Wear Aims to Make a Tech Statement," The New York Times, Jun. 29, 2013.

G.J. Boss, et al., "Dynamic Negotiation and authorization system to record rights-managed content," U.S. Appl. No. 13/706,092, filed Dec. 5, 2012.

* cited by examiner

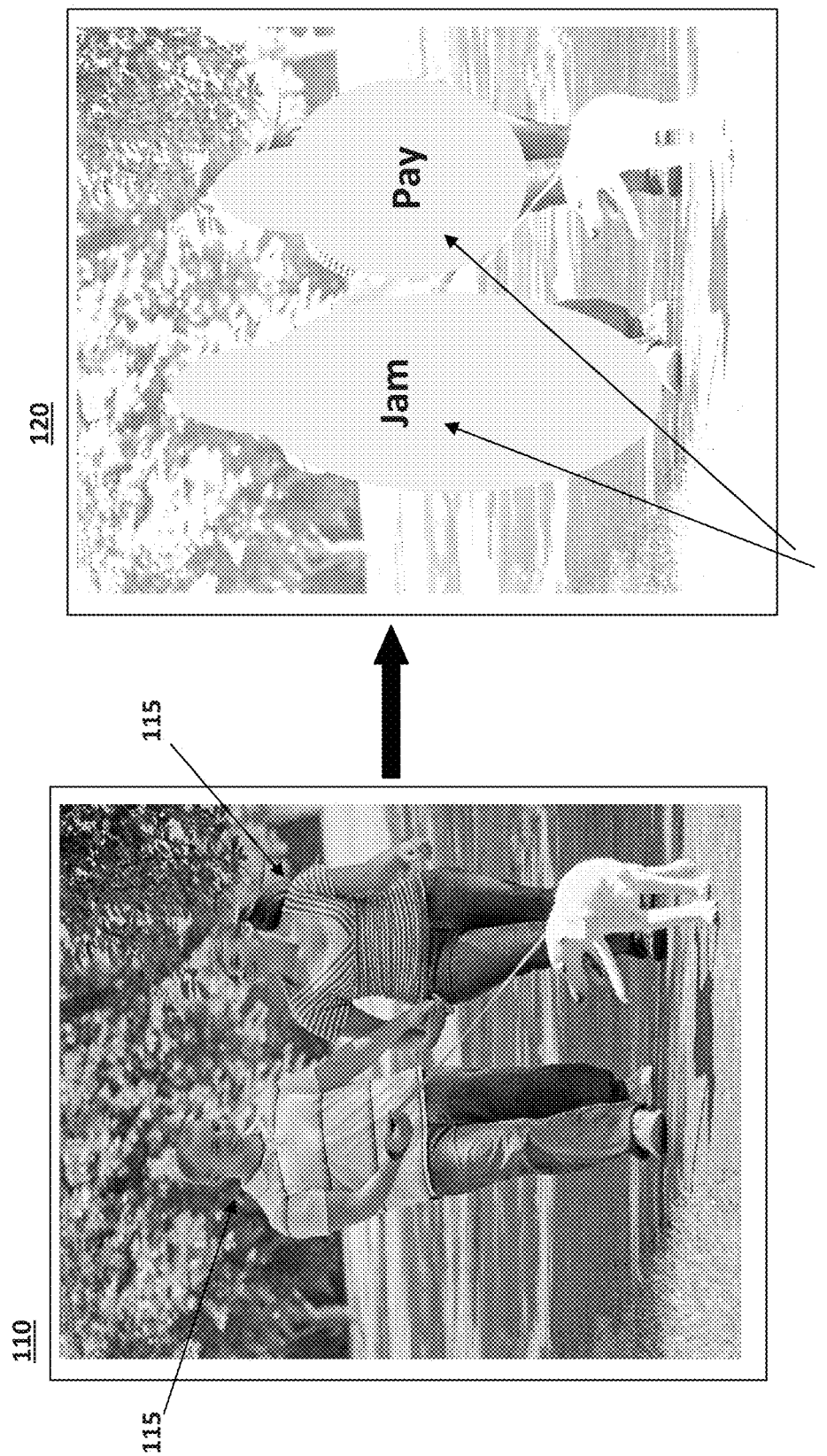

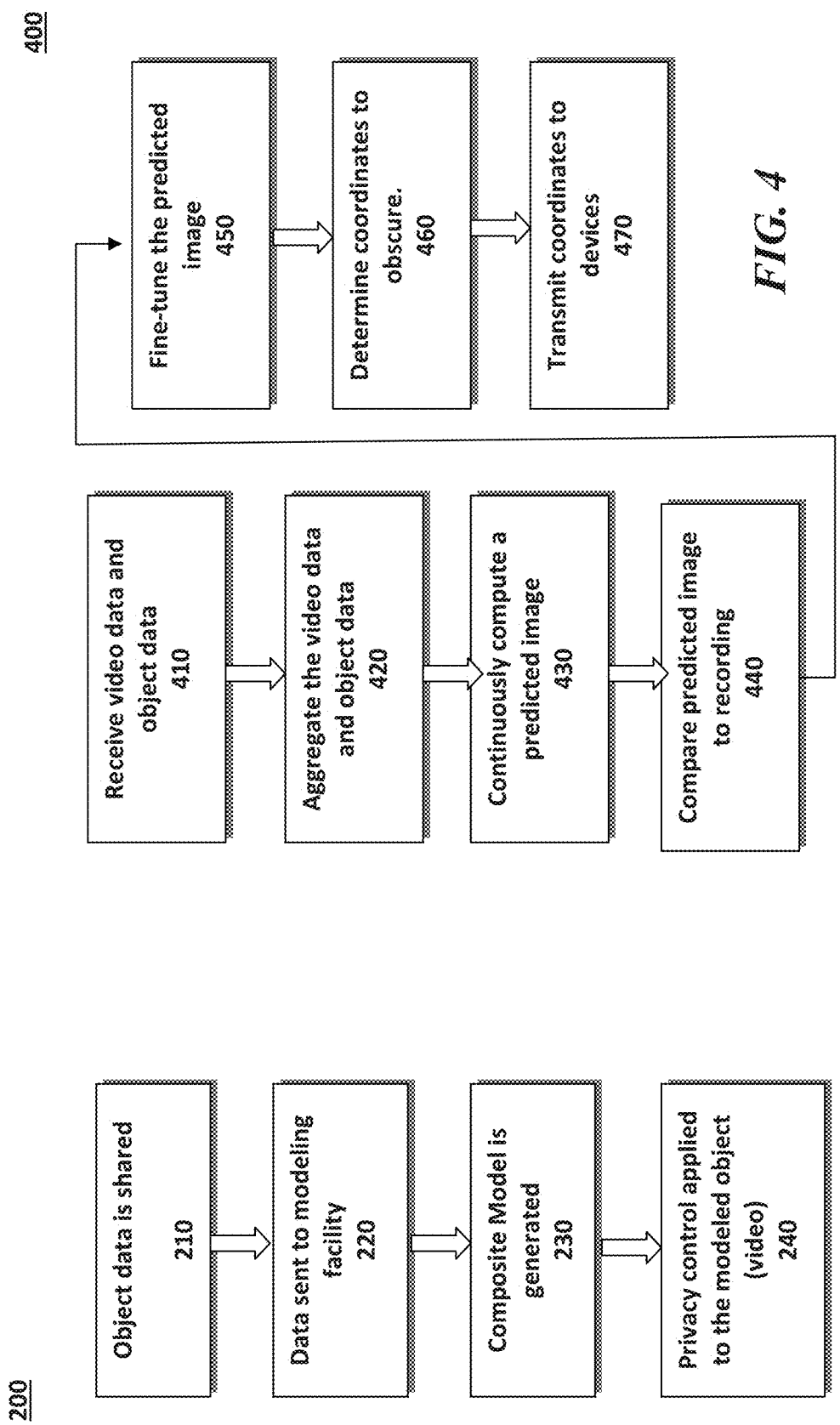

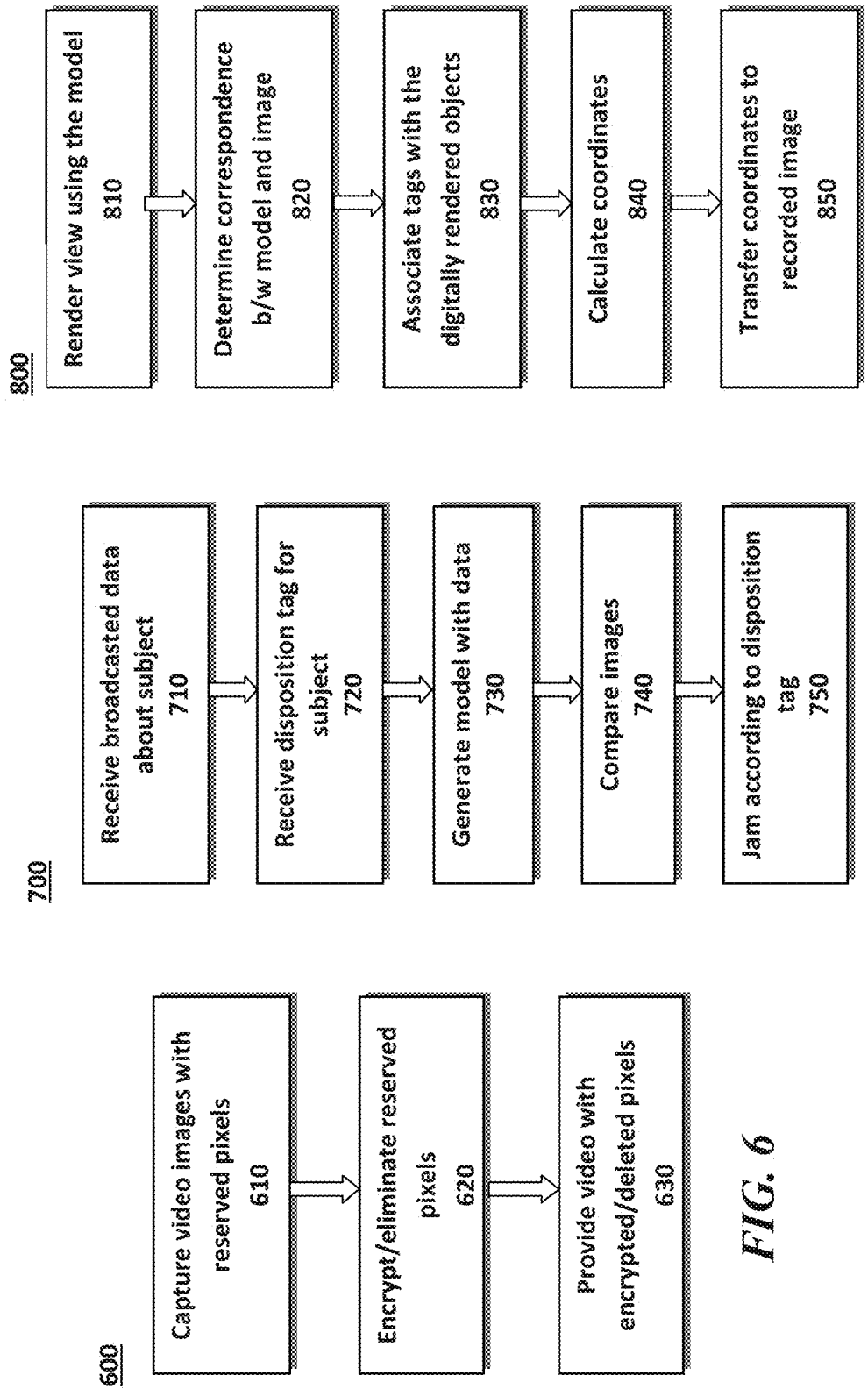

SYSTEM AND METHOD FOR FINE-GRAINED CONTROL OF PRIVACY FROM IMAGE AND VIDEO RECORDING DEVICES

CROSS-REFERENCE TO RELATED APPLICATIONS

None.

FIELD OF THE INVENTION

The invention disclosed broadly relates to the field of digital recordings, and more particularly relates to the field of privacy issues related to digital recordings.

BACKGROUND OF THE INVENTION

Privacy concerns are escalating, due in part to the rise of ever smaller personal "stealth" video recording devices such as Google Glass™ and other head-mounted displays (HMDs), as well as the emergence of civilian drones, now easily available to consumers. Some establishments address this privacy issue by banning HMDs from their premises, although this may cause problems for some who make use of HMDs with prescription lenses. However, the problem of selectively jamming the recording of visible light reflected from physical objects is unsolved.

Existing solutions to the problem of blocking photography of individuals or objects typically require jamming photography using flashes of visible light. This can be disruptive to the environment in general and to individuals in the environment who are not performing recordings. As an example, consider a scenario in which a user is in a semi-public setting, wearing a recording HMD. Much of the scene may be free from concerns, but person 1 and statue 2 should not be recorded. One solution is to jam the recording of these objects. Jamming recordings such as photographs and video requires the ability of the jammer to interfere with the recording device in such a way that the jammed object cannot be recorded, but this jamming may also interfere with the recording of other objects and people in the vicinity.

Furthermore, while jamming is simple when the object emits a jamming signal on a unique channel that is to be recorded (e.g., radar, radio, etc.), it causes problems when the traditional jamming signal would interfere with recording of an otherwise normal day-to-day, public sensory environment and signal (such as visible light and photography). In other words, jamming recording may work, but it is not selective and it may have the side effect of blocking recordings being performed by others, a source of annoyance.

As one interesting example, "Google Glass anti-glasses" developed by Japan's National Institute of Informatics obscure people's facial features when seen on cameras using infrared technology. This solution is specific to faces and does not utilize a reflectance model to predict the image captured by a camera before it is captured. The New York Times, in an article by Jenna Wortham published on Jun. 29, 2013, reports on "stealth wear," clothing and accessories that protect a wearer from being recorded. Stealth wear includes hoodies and cloaks made from reflective fabrics and a purse fitted with an electronic device that reacts to a camera's flash with lights so bright that the subject's face is obscured.

There is a need for a method and system to overcome the above-stated shortcomings of the known art.

SUMMARY OF THE INVENTION

Briefly, according to an embodiment of the present disclosure a method for fine-grained privacy control of image, audio, and video recordings uses a model-based approach to solve privacy issues. The method includes steps or acts of: receiving a digital capture of a subject bound by privacy constraints; receiving information regarding the subject, the environment, and the privacy constraints; using the information to generate a model image of the subject within the environment; associating a disposition tag with an appearance of the subject in the model image; and comparing the model image with the digital capture to determine coordinates in the recording where a privacy control action should be applied.

According to another embodiment of the present invention, a system for fine-grained privacy control of image, audio, and video recordings includes a processor device operably coupled with a memory. The memory stores computer-executable instructions for applying the method steps above.

According to another embodiment of the present invention, a computer program product includes a computer-readable storage medium for causing a computer to perform the method steps for applying privacy control to a digital recording.

BRIEF DESCRIPTION OF THE SEVERAL VIEWS OF THE DRAWINGS

To describe the foregoing and other exemplary purposes, aspects, and advantages, we use the following detailed description of exemplary embodiments of the disclosure with reference to the drawings, in which:

FIG. 1A shows a video image before privacy control is applied, according to an embodiment of the present disclosure;

FIG. 1B shows a composite model of the image of FIG. 1A, according to an embodiment of the present disclosure;

FIG. 2 is a high-level flowchart of a method for privacy control, according to an embodiment of the present disclosure;

FIG. 4 is a lower-level flowchart of the method steps of FIG. 2, according to an embodiment of the present disclosure;

FIG. 6 is a high-level flowchart of the peer-to-peer embodiment;

FIG. 7 is a high-level flowchart of another embodiment of the present disclosure;

FIG. 8 is a low-level flowchart of the compare step of FIG. 7, according to an embodiment of the present disclosure;

Figure 1C:
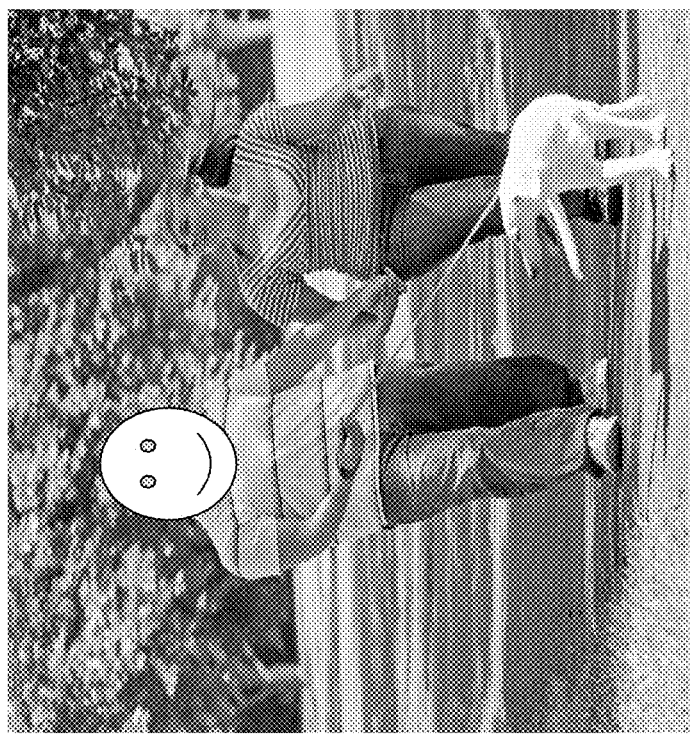
FIG. 1C shows the video image of FIG. 1A with privacy control applied, according to an embodiment of the present disclosure.

While embodiments of the present disclosure as claimed can be modified into alternative forms, specific embodiments thereof are shown by way of example in the drawings and will herein be described in detail. It should be understood, however, that the drawings and detailed description thereto are not intended to limit the disclosure to the particular form disclosed, but on the contrary, the intention is to cover all modifications, equivalents and alternatives falling within the scope of the present disclosure.

DETAILED DESCRIPTION

Before describing in detail embodiments that are in accordance with the present disclosure, it should be observed that the embodiments reside primarily in combinations of method steps and system components related to systems and methods for placing computation inside a communication network. Accordingly, the hardware system components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

We describe a system and method using a digital, model-based approach to apply privacy control to photographic/video/audio recordings. This model-based approach does not require that the recorded objects themselves be modified in any way, such as by emitting a jamming signal light. The privacy control approach of the present disclosure enables dynamic negotiation and authorization of a digital capture of a photo, video, or audio recording. The person, item, or sound-emitting object being recorded can communicate with the recording device (e.g., camera, video camera, or microphone) to convey and negotiate the terms and conditions for recording, possible payment, and provide authorization for the recording and use of the works. The person, item, or sound-emitting object being recorded may also negotiate with a central server to negotiate these terms and conditions.

In this manner, many privacy issues are resolved, perhaps safeguarding the broader adoption of HMDs with integrated video-recording devices. Implementation of embodiments of this disclosure will provide a way for a user of a device such as an HMD to reserve themselves from general recording other uses of the same device, resulting in their image being exempted from the recording, either by jamming or other method.

Embodiments of the present disclosure allow photographic/video/audio recording of a physical environment while obscuring the recording of particular people and/or objects in that environment that are under privacy constraints. An example of this is shown in the images of FIGS. 1A, 1B, and 1C. In FIG. 1A we show a video image 110 of a park scene that includes both persons and objects. In this image, the subjects 115 shown walking a dog in the foreground are subject to privacy constraints on their images. The reasons that some people or objects are subject to privacy constraints are numerous. Perhaps the person or object is famous and privacy rules apply. Or, it may be that the person or object simply did not give the recorder a waiver to include him/her in the recording. In the example of FIG. 1A, the female subject is famous and the recorder must pay a fee in order to use her image. The male subject is not famous but has not provided his consent to use his image.

FIG. 1B shows an image of a composite model 120 that is generated from the image 110 of FIG. 1A. The modeled image 120 shows embedded annotations, also called disposition tags 125, that reveal what privacy action must be taken according to the subject's privacy constraints. In this image 120 we see that the female subject 115 allows recording of her image, but only if payment is made; and the male subject has not authorized the recording of his image. FIG. 1C shows a dynamically updated modeled image 130 of FIG. 1A, with the privacy control actions applied. In this case, the image of the female subject is shown pursuant to payment and the image of the male subject is reserved from recording to protect his identity. In this example only his face has been jammed.

Applications.

These are some of the multiple uses for the privacy control method according to an embodiment of the present disclosure:

a) Selective blocking to enhance privacy. For example, a celebrity may not want to be recorded but does not want to disturb recording of others in the vicinity. Perhaps parents may not wish their minor children to appear in public photos. Or, a museum may want to protect a famous statue from being recorded without mounting a blocking light since the light would disturb patrons and could cause damage to paintings in the room; and b) targeted advertising or recording-based incentives. For example, the advertising of a live show might be recordable by people who attended the show but not others. Recording along particular angles and portions of 3D (three dimensional) space could be auctioned off. For example, a government or organization could make money by auctioning off particularly pleasing views of monuments, water/mountain views, and the like, permitting recording of these views by only by those who have paid.

Referring now to FIG. 2, we show a high-level flowchart 200 of the method for privacy control according to an embodiment of the present disclosure. The disclosure collaboratively builds a digital model 120 of the reflectance environment in the following steps: in step 210 object data (including form and reflectance) is shared by multiple users. Some examples of object data that is shared include: position, shape, and orientation information, texture maps, meshes, degrees of freedom, articulations of a wire frame model of a body, and rate of motion; any data accessible locally from object and from the environment in which it resides (for example, photographs of the environment) that may be used to construct a model of the object in its environment may be transmitted. We define reflectance as the ratio of the light reflected by a surface to the total light striking the surface. Similarly, for an audio recording management system, an acoustic model may be constructed.

In step 220 the object data is transmitted to a modeling facility that can be located remotely. A modeling facility may be local to a location or place of business, where certain recording policies require implementation, and may include a server supporting wireless communication to all image recording devices in the location. Alternately, a server at the facility may receive image information from a recording device and relay this information together with location policies to a remote data center responsible for implementing the modeling facility. Alternately, a multi-tenant system may implement the modeling facility. The modeling facility may include the recording devices themselves, such that policies and model information are rendered into models and required occlusions are determined local to the recording device and updated models are shared among recording devices to speed modeling calculations.

Next, in step 230 the users and/or facility continuously generate a composite model 120 of the reflectance environment using the collected data. In step 240 digital rights imperatives including encryption, recording blocking signals (e.g. "jam" the recording), or secure payment requirements for recording are associated with the modeled and recorded objects 130. The digital rights may be in the form of programs, rules, or other instructions that can be applied to various modeled and recorded objects. The confidence level in the proper identification of the subject being recorded may control the amount and/or nature of the "jamming," or the value of this confidence level may trigger a confidence-increasing action (e.g. a signal sent to a crowd-sourcing component).

More particularly, the system disclosed herein may involve: 1) an item to be recorded (e.g. an avatar in a virtual universe), 2) an associated confidence-increasing action to increase confidence in item identification (e.g. object recognition of a famous statue in photographic view along with GPS), 3) an automatic transmission of permissions with respect to use of recording of said item (e.g. copyright status, encryption requirements, and secure payment of fees), and a 4) real sensory affordance as a reminder that the item has associated permission characteristics. Some examples of sensory affordances are: a partially obscured image of the item on an HMD, a button on a camera that vibrates, and a chirp heard when an object is in view, or in view from a particular angle. The image that is reserved (omitted) from recording can be a person or object that is reserved from only particular viewing angles. For example, a person may wish to hide a scar, tattoo, or other identifying feature that is only visible on one side.

In some cases, it may be important to indicate that a particular recording device is blocked, obscured, or otherwise disabled from recording a portion of the image rather than simply not recording at all. The flashing red light for recording might be modified to flash more quickly when the recording device is being disabled from recording by the modeling facility. Note that recording may continue, but the light can be flashing at a different tempo to indicate that a portion of the scene cannot be recorded. This indicator allows the person recording to know about the disabling if the recorder is not wearing the recording device as a HMD. It also allows the recorded person to know that someone was trying to record him/her but was blocked (or that a purchase was made, etc.), and allows others to know that this appearance is blocked (e.g., so that they do not try to do the same thing.)

System Components.

The system and method for privacy control make use of various software, hardware, and firmware components such as:

a) a means for broadcasting the data needed to predict an appearance (of a person or other object) from many angles;

b) a means for broadcasting a disposition "tag" associated with said person or object appearance providing directives on how the data should be offered to or blocked from users. This component is not necessarily provided by the same entity as the one providing the data needed to predict an appearance.

c) a means for real-time comparison between the object data, an associated image of a predicted appearance, and recorded photograph (or video) currently being made, and d) an action-taking component that takes a privacy control action based on the comparison and the tag. The privacy control action such as jamming can range from complete obscuration to blurring of certain pixels or the image as a whole, and may include replacement of a segment of the image with a generic image, encrypting these portions in recorded signals, and/or securing payment for the removal of jamming or decryption of the recorded portions. The action cam be based on any sort of access to or operation with the object, such as the ability to send data to an object (posting comments about the statue), read data from an object (the label on a statue), communicate with the object, and trigger actions associated with the object (e.g., printing an image of it).

We can predict an appearance of an object such as a face in a recording using methods that are known in the art and beyond the scope of this description. For example, a simple articulated model of the human figure may include information such as height, weight, angle of shoulder orientation, angle of head orientation, and joint angles for the shoulders, elbows, wrists, thighs, knees, and ankles By communicating these data, a receiving facility can quickly generate a wire-mesh model of a standard human body that includes these parameters.

The data can be broadcast using a model description language built on, for example, XML, and may include such data elements as "[Left-elbow-angle][15.2]". Data elements would be composed into longer messages to be sent to and interpreted by a receiving modeling facility.

Figure 3:
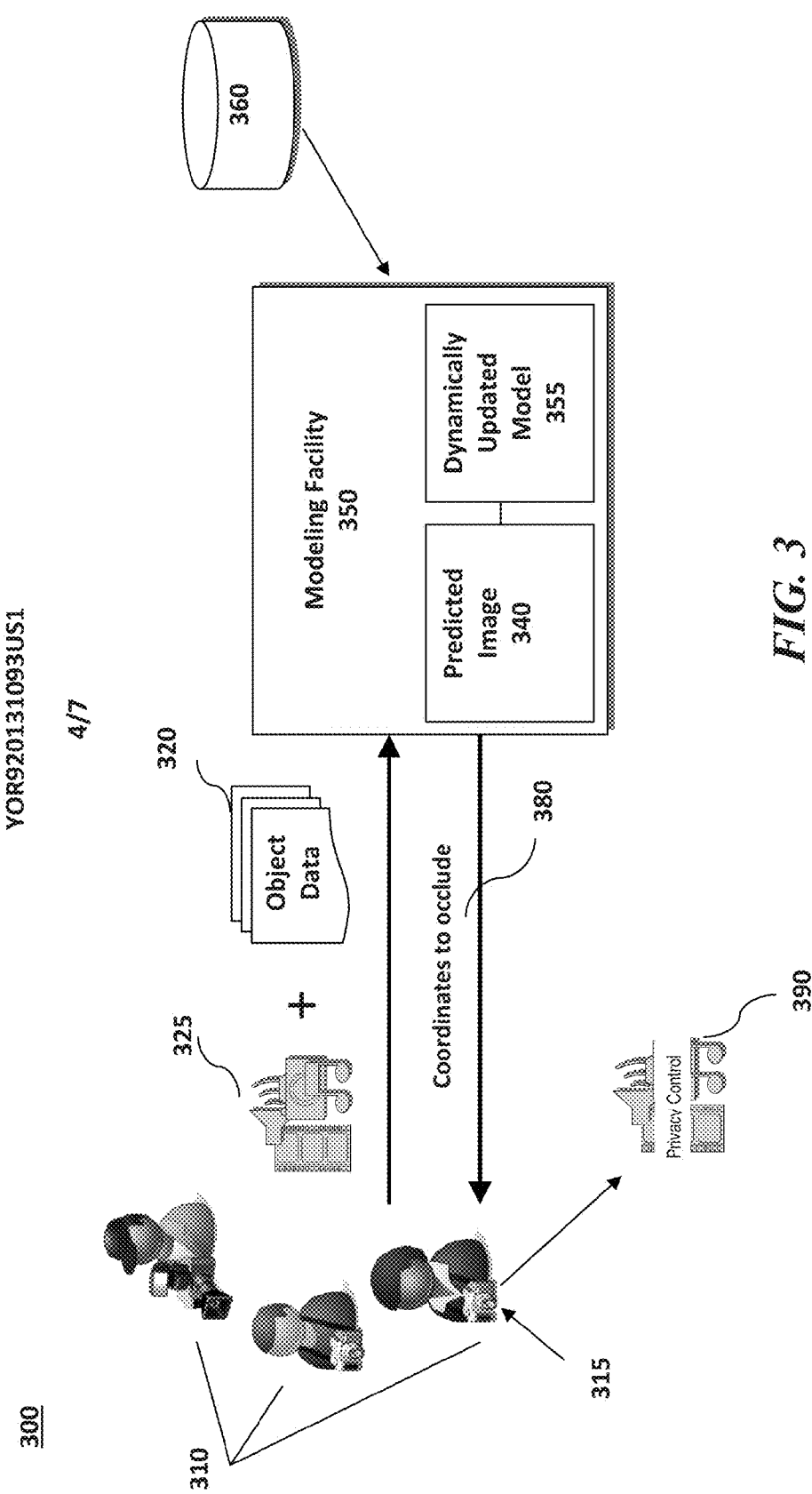
FIG. 3 is a simplified block diagram of a system for applying privacy control, according to an embodiment of the present disclosure.

Referring now to FIG. 3 we show a simplified illustration of a system 300 for implementing privacy control according to an embodiment of the present disclosure. The inputs to the system 300 are: the digital recordings (photo/video/audio) 320 and data 325 about the recordings and the recorder 310 performing the recording 320.

Additional inputs may be received from other sources 360, such as location profiles wherein certain kinds of recording may always be regulated (e.g., locker rooms); customer databases, wherein a set of customers may have opted out of personalized services that require video identification of the customer while in a place of commerce (for example, special services targeted to certain bank customers waiting in a queue); and object specific information from a database, such as copyright or ownership information. The outputs are the set of coordinates required to occlude the image 320 and when applied, the final output is the occluded image 390 with privacy control applied.

A camera or other recording device 310 transmits data 325 about a user performing the recording or other objects in the environment, such as automated recording system, to a modeling facility 350 which may be remote, on a particular user or system's device, or composed from parallel computations on multiple user devices. Object data 325 includes information about what portions of the viewed subject, set of subjects, or other objects in the frame are to be jammed, encrypted, or reserved for payment. For example, any of the following can be tagged: "recording allowed," "recording allowed but with payment," "recording allowed, but only at a certain resolution," "recording allowed but only with credit," "recording allowed for purposes A and B, but not C," or other prerequisites to recording/non-recording.

This "disposition" may apply only in particular contexts, such as particular times of day or only with certain people present, etc. and/or in particular places in 3-space around the object (3D zones). These pre-determined disposition parameters are often negotiated in advance and can alter the privacy control action applied by modifying the action, or eliminating it altogether. For example, a celebrity may demand that her child not be photographed unless she is present.

The modeling facility 350 aggregates the data 325 supplied by the users 310 and their devices or by sensors or automated recording systems in the environment to construct a dynamically updated model 355 of the whole environment, objects in it, and the disposition tags 125. Users 310 of the system 300 take photographs or video recordings 325 of the environment which are transmitted to the modeling facility 350 together with the location and direction of the camera 315 used to take the photograph/ recording 325. In some cases, exact information about the location and direction of the recording device cannot be obtained. In this case, the modeling facility can apply default values. For example, if the height of a camera is not available, then the height of a camera held by an average height person is used.

The modeling facility 350 continuously computes a predicted, or modeled image 340 from the perspective of each user's recording device such as the lens of a camera 310 of the system 300 using the model by performing ray tracing, subject to the reflectance and form constraints of the shared data 320 from users 310 as well as the location and direction of the camera transmitted to the facility with recorded images 320. The location of the camera can be determined by positioning systems such as GPS or in some environments through Bluetooth or other short-distance radio technology. The direction of the camera is usually available from the camera itself. For example, mobile devices may provide such information for determining orientation of the device to adjust the user interface. The modeling facility 350 compares the predicted image 340 to the recorded images 320 and determines regions of the photographs that are to be jammed, encrypted, or reserved for payment in the recording devices according to the disposition tags.

The modeling facility 350 performs actions to reduce, correct, and/or handle errors in the determination of regions of photographs 320 to be jammed potentially introduced in the prediction and comparison steps. In a reduction step, the modeling facility 350 may perform sampling over the alignment of images over time to increase confidence that the appropriate regions may be computed. In a correction step, errors may be corrected by smoothing or increasing/decreasing the regions. For example, a greater area may be reserved for payment so as to cover the possibility of errors in providing 'free' recordings.

In 'handling' errors, the modeling facility 350 may perform actions to handle the errors that may be introduced, such as:

1. if the confidence of the comparison is above a threshold, a "jamming" action (or other action described herein) may be taken. Similarly, the "degree" of jamming may correspond to the confidence level. For example, if the system only has a low confidence in comparison the jamming may be less severe (e.g. partial blurring). For example, jam_amount=f(confidence level).

2. As another example, a confidence-increasing action may be taken. For example, if the confidence in the comparison is low, additional databases may be queried containing models of the objects in the scene, the user of the camera may be asked a question, or an automatic trigger to crowd-sourcing may be made. The question may indicate the zone of low confidence. Crowd-sourcing here refers to sending the work of determining the match between portions of the model and portions of the digital recording to people, typically in an online community or service, in exchange for a small payment.

3. Also, in order to boost confidence in identifying people who may wish to be jammed, the system may use an automated analysis of electronic calendars so as to increase the confidence that a subject is attending a conference, party, convention, and the like. In this manner, for example, the confidence that Dr. Bob is actually in the conference room is boosted because his calendar says that he is attending a particular meeting. Although this calendar knowledge has the potential to decrease privacy, Dr. Bob may be willing to opt-in to this service if it promises to do its best to jam him so he can't be photographed without permission.

Continuing with the system 300 description, the modeling facility 350 relays to the recording device 315 the coordinates 380 of the recorded image 325 to be occluded, blurred, or otherwise reserved or distorted. The cameras 315 perform the operations to control the recording, outputting an image 390 that protects the privacy of a person and/or object. This can involve one or more of the following:

a) Recorded images 325 may be modified with digital scotomata (blind spots) wherever these jammed regions occur and the final modified images are made accessible to the photographer through the standard device interfaces subject to the dispositions. Recorded sound may be similarly jammed with noise.

b) Data to enable recording may be overlaid on the jammed regions. For example, prices for regions subject to payment, direction to change resolution where certain resolution images are not allowed, or credentials required for decryption.

Digital Overlays.

Figure 9A:
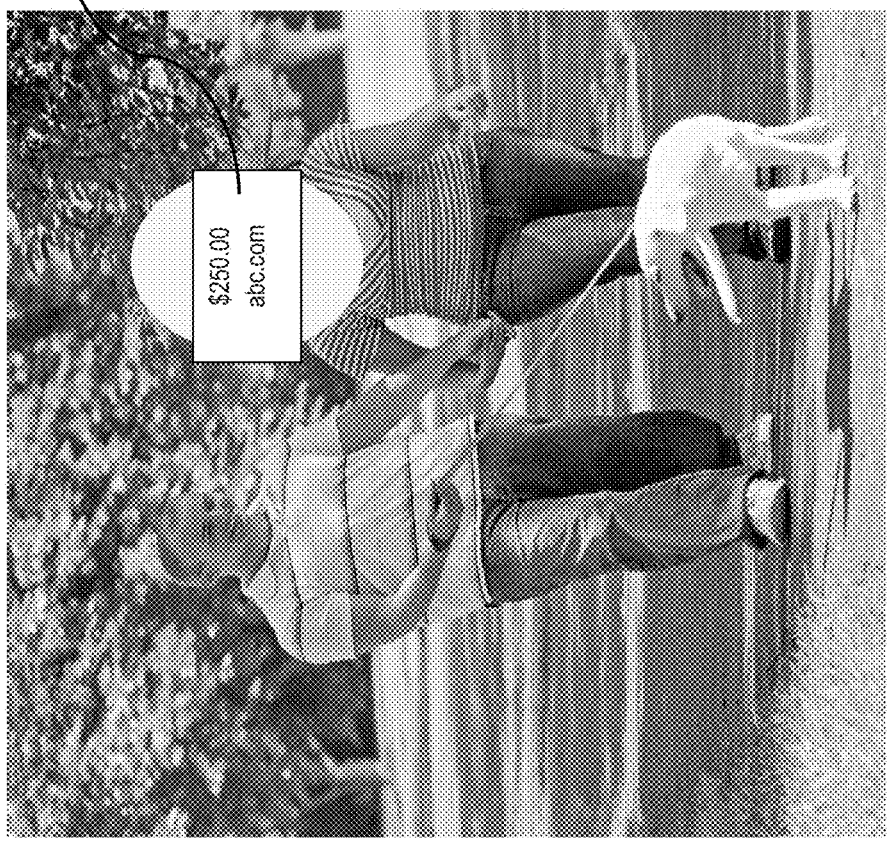
FIG. 9A shows the video image of FIG. 1A with an overlay applied over the reserved portion of the image, according to an embodiment of the present disclosure.
Figure 9B:
FIG. 9B shows a zoomed-in portion of the video image of FIG. 1A with a different overlay applied over the reserved portion of the image, according to an embodiment of the present disclosure.
Figure 9C:
FIG. 9C shows another zoomed-in portion of the video image of FIG. 1A with a quick response overlay applied over the reserved portion of the image, according to an embodiment of the present disclosure.

Referring now to the examples of FIGS. 9A, 9B, and 9C we show examples of data overlays 925 which can be applied to the reserved portion of images. In FIG. 9A we show the image of FIG. 1A with an overlay 925 providing the information necessary to display the image according to the particular privacy constraints associated with the image. In the example of FIG. 9A, the overlay 925 shows pricing information and a location where payment can be made.

In FIG. 9B we show an example overlay 925 that might be used when the privacy constraint involves the orientation that can be shown. FIG. 9C shows an exemplary overlay 925 that uses a quick response (QR) code to provide the information needed to adhere to the privacy constraints. For example, the QR code can provide the location (webpage) where payment can be made, as well as providing instructions and pricing for the image. One with knowledge in the art will appreciate that the examples shown are by no means exhaustive of the data that can be provided in an overlay 925.

Referring now to FIG. 4, we show a lower-level, more comprehensive flowchart 400 of the method for privacy control, according to an embodiment of the present disclosure. In step 410 the modeling facility 350 receives the recording 320 to be modeled, and data 325 about the recording and the recorder 310. Additional inputs can be received from other users 310 within the environment and from other sources 360.

In some embodiments, there occurs a continual exchange of image and object shape, composition, reflectance, and color information from and/or among users 310 of the system 300 via a centralized or peer-to-peer modeling facility 350. The outcome is to create a digital model 355 of an environment which is used on an ongoing basis to control recording devices in the environment. This control may include jamming of certain portions of the recorded signals (such as pixels in a recorded image or video), encrypting these portions in recorded signals, and/or securing payment for the removal of jamming or decryption of the recorded portion.

In step 420 the modeling facility 350 aggregates the video data 325 and object data 320 dealing with a particular environment and/or person. Consequently, each item of data received by the modeling facility 350 must be identified as belonging to a certain environment and/or person. In step 430 the modeling facility 350 continuously computes a predicted image 340 of the recordings 325 it receives. In step 440 the predicted image 340 is compared to the received images 320 to determine the coordinates for applying privacy control. In step 450 fine-tuning is performed on the predicted image 340 to increase the probability (confidence level) that the correct portions of the images 320 will be obscured.

Once the image 320 is fine-tuned with a high confidence level that the appropriate portions of the image 320 have been identified for privacy control, the coordinates of that portion of the image 320 are determined in step 460. In step 470, the coordinates are transmitted to the recording devices 315 for application to the images 320.

The images successfully recorded with the privacy controls in place can be stored and later retrieved. For example, if it is critical that no one record a certain painting, then the museum security could do some manual checks on images. The confidence level and other metadata are stored with the images so 'questionable' (low confidence) images can be retrieved.

If someone is blocked from recording, but feels they are being blocked unfairly, the person can request a temporary waiver (time, location fencing, or both).

Benefits and Advantages of the Privacy Control Method.

1) The ability to digitally block recording of information that is otherwise publicly available (i.e., reflected light)

2) The ability to create commerce around the digital encryption and decryption of the digitally jammed public signal.

3) The ability to allow users of the system to determine how their publicly emitted signals (such as visible light) may be used within the context of the system.

Monetizing.

The services of the modeling facility 350 can be paid for on a subscription basis, or on a piecemeal basis. For example, a government or organization could make money by auctioning off particularly pleasing views of monuments, water/mountain views, and the like.

Virtual Application.

We make use of the virtual simulation of the 3D space to simulate the appearance of a reserved object from the point of view of the recording device 315. This is critical for applications where the actions (encryption, blocking, blurring, reserving for purchase) are dependent on blocking of the item to various recording devices and various angles in 3D, as might happen for paparazzi (photographers who pursue celebrities) trying to get a recording of a celebrity.

The recording device 315 may be a pseudo-camera in a virtual universe. The information may be automatically stored on an electronic calendar (e.g. as a calendar entry on the day the photograph was captured). If the object cannot be "photographed" in a virtual universe, it may automatically be swapped with a generic image or blurred.

Peer-to-Peer Embodiment.

Referring now to FIG. 6, according to one embodiment of the present disclosure, the system runs in a peer-to-peer opt-in context. The peer-to-peer embodiment discussed now with respect to the flowchart 600 of FIG. 6, supports reservations of recordings of certain objects or people to facilitate a market for a class of recording devices such as head-mounted recorded devices (HMDs) and displays. To support the market in making objects of the peer-to-peer embodiment, we describe a hardware implementation of the reservation, such that recorded pixels are encrypted and/or destroyed automatically and without opportunity for hacking with normal efforts, such that a user of the device is assured to not record reserved content in an environment. This builds confidence that the class of device is manageable given certain social norms. One example of a hardware implementation of encryption of images can be found in U.S. Pat. No. 7,240,208 "Encrypting digital camera with automatic encryption key deletion" incorporated herein. In the embodiment we propose, only those portions of image data corresponding to reserved pixels are encrypted. In step 610, using a HMD, we capture video images with reserved pixels. These images may be images of another person also wearing a HMD who wants his/her image kept out of the video recording. In step 620, the recording device associated with the HMD encrypts or eliminates the reserved pixels and in step 630 the video recording is provided with the reserved pixels rendered not-viewable.

Digital Jamming.

According to another embodiment of the present disclosure, a third party, or the objects themselves, may provide changing and updated information about what parts (e.g. fine-grained content) should be jammed, encrypted, or reserved for payment. The information can introduce noise or masking for partial transparency of information. Digitally jammed portions on recordings could appear "cut out" or could be replaced by a digital approximation for smoothing into a background, or replaced by digital objects, including generic digital images. Jamming can range from complete obscuration to blurring to replacement of a segment of the image with a generic image such as that shown in FIG. 1C. Enabling actions such as the amount of payment may be displayed.

The digital replacements can be computed by recognizing surrounding digital objects. For example, if a movie star does not want to be recorded with an unpleasant fan, a stock image of the movie star's home could be merged into the photograph/recording by inferring from the base of photographs with the movie star having mostly a house picture in the background and the surrounding pixels matching the house color.

Referring now to FIG. 7, we show a flowchart 700 wherein disposition tags are supplied by a person or object with knowledge of the subject. In step 710 the recorder receives broadcasted data about the subject. This data contains information needed to predict the appearance of the subject (or part of the subject) within the recorded environment, perhaps from different angles.

In step 720 the same person or object also supplies the disposition tag (Do-not-Record tag) containing the privacy constraints for the subject. Constraints can be applied to supplement the tags. For example, "Do-not-Record between 10:00 a.m. and 2 p.m. in the left outside garden of the museum but not the right outside garden." Time, location, or both can be applied to a disposition. Criteria may include equalities and inequalities (>, >=, ==, <, <=). Next, in step 730 the recording device, a location specific facility, or a remote modeling facility generates an image model of the expected scene with the broadcasted data (and any other data it receives about the environment). The digital disposition tags are then associated with the corresponding image model components.

Once the model is complete with the digital disposition tags, in step 740 we compare pixels of the image model with the real image data in real-time and determine pixels of correspondence and, indirectly, their corresponding disposition tags. When a match is found between the subject and the model component associated with the disposition tag, the portion of the image corresponding to the subject is jammed in step 750.

Referring now to FIG. 8, we show a low-level flowchart of the compare step 740 of FIG. 7. In step 810, we begin the comparison by rendering a view of the environment from the position and orientation of the recording camera using the collaboratively constructed model of the environment. This view may be coarse, but sufficiently detailed to allow a correspondence to be determined between pixels in the recorded image and digital objects in the rendering in step 820.

In this way, in step 830 we are able to associate the metadata pertaining to permission to photograph or rights to use images of the objects (disposition tags) with the digitally rendered objects. Once we have associated the disposition tags with the subject in the model, we calculate the coordinates of the pixels in step 840 and transfer those coordinates to corresponding regions of the recorded image in step 850. The storage of the portions of the images, the object ID, and the disposition tag applied and other metadata may also be stored in a data BLOB. A BLOB in this disclosure is defined as a or basic large object of multimedia data stored in a database.

Figure 5:
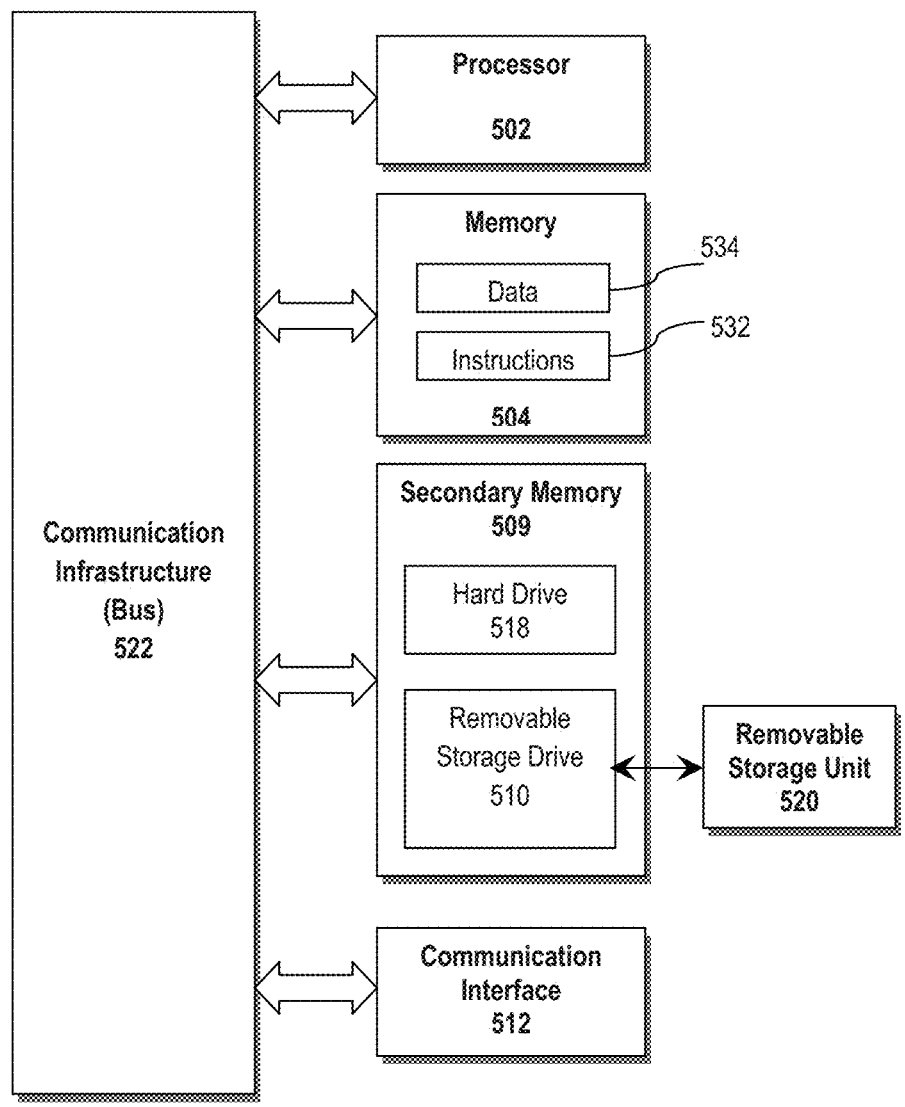
FIG. 5 is a high level block diagram showing an information processing system configured to operate according to an embodiment of the present disclosure.

FIG. 5 Hardware Embodiment.

Referring now to FIG. 5, there is provided a simplified pictorial illustration of an information processing system 500 for privacy control of digital recordings, in which embodiments of the present disclosure may be implemented. For purposes of this disclosure, computer system 500 may represent any type of computer, information processing system or other programmable electronic device, including a client computer, a server computer, a portable computer, an embedded controller, a personal digital assistant, Cloud computing, Internet TV, and so on. The computer system 500 may be a stand-alone device or networked into a larger system. Computer system 500, illustrated for exemplary purposes as a networked computing device, is in communication with other networked computing devices (not shown) via a network. As will be appreciated by those of ordinary skill in the art, network may be embodied using conventional networking technologies and may include one or more of the following: local area networks, wide area networks, intranets, public Internet and the like.

Throughout the description herein, an embodiment of the invention is illustrated with aspects of the invention embodied solely on computer system 500. As will be appreciated by those of ordinary skill in the art, aspects of the invention may be distributed amongst one or more networked computing devices which interact with computer system 500 via one or more data networks. However, for ease of understanding, aspects of the invention have been embodied in a single computing device—computer system 500.

Computer system 500 includes inter alia, processing device 502 which communicates with an input/output subsystem 506, memory 504, storage 510 and network. The processor device 502 is operably coupled with a communication infrastructure 522 (e.g., a communications bus, crossover bar, or network). The processor device 502 may be a general or special purpose microprocessor operating under control of computer program instructions 532 executed from memory 504 on program data 534. The processor 502 may include a number of special purpose sub-processors such as a comparator engine, each sub-processor for executing particular portions of the computer program instructions. Each sub-processor may be a separate circuit able to operate substantially in parallel with the other sub-processors.

Some or all of the sub-processors may be implemented as computer program processes (software) tangibly stored in a memory that perform their respective functions when executed. These may share an instruction processor, such as a general purpose integrated circuit microprocessor, or each sub-processor may have its own processor for executing instructions. Alternatively, some or all of the sub-processors may be implemented in an ASIC. RAM may be embodied in one or more memory chips.

The memory 504 may be partitioned or otherwise mapped to reflect the boundaries of the various memory subcomponents. Memory 504 may include both volatile and persistent memory for the storage of: operational instructions 532 for execution by CPU 502, data registers, application storage and the like. Memory 504 preferably includes a combination of random access memory (RAM), read only memory (ROM) and persistent memory such as that provided by a hard disk drive 518. The computer instructions/applications that are stored in memory 404 are executed by processor 502. The computer instructions/applications 532 and program data 534 can also be stored in hard disk drive 518 for execution by processor device 502. Those skilled in the art will appreciate that the functionality implemented within the blocks illustrated in the diagram may be implemented as separate components or the functionality of several or all of the blocks may be implemented within a single component.

The computer system 500 may also include a communications interface 512. Communications interface 512 allows software and data to be transferred between the computer system and external devices. Examples of communications interface 512 may include a modem, a network interface (such as an Ethernet card), a communications port, a PCMCIA slot and card, etc. Software and data transferred via communications interface 512 are in the form of signals which may be, for example, electronic, electromagnetic, optical, or other signals capable of being received by communications interface 512.

Computer Program Product.

Referring again to FIG. 5, the present invention may be a system, a method, and/or a computer program product. The computer program product may include a computer readable storage medium (or media) 520 having computer readable program instructions thereon for causing a processor to carry out aspects of the present invention. The computer readable storage medium 520 can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions 532 described herein can be downloaded to respective computing/processing devices from a computer readable storage medium 520 or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions 532 for storage in a computer readable storage medium 520 within the respective computing/processing device.

Computer readable program instructions 532 for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions 532 may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions 532 may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Therefore, while there has been described what is presently considered to be the preferred embodiment, it will understood by those skilled in the art that other modifications can be made within the spirit of the disclosure. The above description(s) of embodiment(s) is not intended to be exhaustive or limiting in scope. The embodiment(s), as described, were chosen in order to explain the principles of the invention, show its practical application, and enable those with ordinary skill in the art to understand how to make and use the disclosure. It should be understood that the disclosure is not limited to the embodiment(s) described above, but rather should be interpreted within the full meaning and scope of the appended claims.

We claim:

1. A method for providing privacy control for digital capture of a recording, said method comprising:

using a processor device, performing:
  receiving the digital capture from a recorder, said digital capture comprising the recording of a person within an environment, wherein said person is bound by privacy constraints;
  receiving information regarding the environment, the person, and the privacy constraints;
  identifying the person within the digital capture based on the received information regarding the person;
  generating a model image of the environment including the person by applying the information about the person, the environment, and the privacy constraints;
  associating a disposition tag with an identified person in the model image, wherein said disposition tag references a privacy control action to take according to the person's privacy constraints;
  comparing the model image with the digital capture of the recording; and
  determining coordinates in the recording where the privacy control action is to be applied.

2. The method of claim 1 further comprising sending the coordinates to the recorder.

3. The method of claim 1 wherein receiving the information comprises receiving data needed to identify the person from multiple angles.

4. The method of claim 1 wherein the privacy restriction varies according to pre-determined disposition parameters.

5. The method of claim 1 wherein the privacy restriction comprises a restriction selected from a group consisting of: no recording of the person allowed, recording of the person allowed but with payment, limited resolution recording of the person only, recording of the person allowed at certain time of day, and recording of the person allowed only with credit.

6. The method of claim 3 wherein identifying the person comprises performing a real-time comparison between the data needed to identify the person and the recording to provide a confidence level of an identification of the person.

7. The method of claim 6 wherein identifying the person further comprises increasing the confidence level of the identification through at least one action selected from a group consisting of: sampling, smoothing the tagged area, increasing the tagged area, decreasing the tagged area, analysis of digital positioning data, and analysis of calendar data.

8. The method of claim 7 wherein the confidence level controls the privacy control action applied to the image.

9. The method of claim 7 wherein the confidence level triggers a signal sent to a crowd-sourcing component to increase the confidence level.

10. The method of claim 1 wherein the privacy control action is selected from a group consisting of: jamming, applying a low resolution, overlaying the image, encryption, introduction of noise, masking for partial transparency of information, and replacement of image.

11. An information processing system for providing privacy control for digital capture of a recording, comprising:
  a processor device; and
  a memory operably coupled with the processor device, said memory comprising computer-executable instructions causing a computer to perform:
    receiving the digital capture from a recorder, said digital capture comprising the recording of a person within an environment, wherein said person is bound by privacy constraints;
    receiving information regarding the environment, the person, and the privacy constraints;
    identifying the person within the digital capture based on the received information regarding the person;
    generating a model image of the environment including the person by applying the information about the person, the environment, and the privacy constraints;
    associating a disposition tag with an identified person in the model image, wherein said disposition tag references a privacy control action to take according to the person's privacy constraints;
    comparing the model image with the digital capture of the recording; and
    determining coordinates in the recording where the privacy control action is to be applied.

12. The information processing system of claim 11 wherein the recording is an audio recording.

13. The information processing system of claim 11 wherein the computer-executable instructions further cause the computer to perform: applying the privacy control action to the recording.

14. The information processing system of claim 13 wherein applying the privacy control action comprises applying a data overlay to at least a portion of the person in the recording.

15. The information processing system of claim 11 wherein the privacy restriction comprises a restriction selected from a group consisting of: no recording of the person allowed, recording of the person allowed but with payment, limited resolution recording of the person only, recording of the person allowed at certain time of day, and recording of the person allowed only with credit.

16. The information processing system of claim 11 wherein identifying the person further comprises increasing a confidence level of the identification through at least one action selected from a group consisting of: sampling, smoothing the tagged area, increasing the tagged area, decreasing the tagged area, analysis of digital positioning data, and analysis of calendar data.

17. The information processing system of claim 16 wherein the confidence level controls the privacy control action applied to the recording.

18. A computer program product comprising a non-transitory computer-readable storage medium with computer-executable instructions for providing privacy control for digital capture of a recording stored thereon, said computer-executable instructions comprising:
  receiving the digital capture from a recorder, said digital capture comprising the recording of a person within an environment, wherein said person is bound by privacy constraints;
  receiving information regarding the environment, the person, and the privacy constraints;
  identifying the person within the digital capture based on the received information regarding the person;
  generating a model image of the environment including the person by applying the information about the person, the environment, and the privacy constraints;
  associating a disposition tag with an identified person in the model image, wherein said disposition tag references a privacy control action to take according to the person's privacy constraints;
  comparing the model image with the digital capture of the recording; and
  determining coordinates in the recording where the privacy control action is to be applied.

19. The computer program product of claim 18 wherein the privacy restriction comprises a restriction selected from a group consisting of: no recording of the person allowed, recording of the person allowed but with payment, limited resolution recording of the person only, recording of the person allowed at certain time of day, and recording of the person allowed only with credit.

20. The computer program product of claim 18 wherein identifying the person further comprises increasing a confidence level of the identification through at least one action selected from a group consisting of: sampling, smoothing the tagged area, increasing the tagged area, decreasing the tagged area, analysis of digital positioning data, and analysis of calendar data.

\* \* \* \* \*